US008543578B2

(12) United States Patent
Spaggiari (10) Patent No.: US 8,543,578 B2
(45) Date of Patent: Sep. 24, 2013

(54) METHOD AND SYSTEM FOR AUTOMATICALLY IDENTIFYING RELATED CONTENT TO AN ELECTRONIC TEXT

(75) Inventor: Stefano Spaggiari, Modena (IT)

(73) Assignee: ADmantX, S.p.A., Naples (IT)

( * ) Notice: Subject to any disclaimer, the term of this patent is extended or adjusted under 35 U.S.C. 154(b) by 750 days.

(21) Appl. No.: 12/637,558

(22) Filed: Dec. 14, 2009

(65) Prior Publication Data

US 2011/0145250 A1 Jun. 16, 2011

(51) Int. Cl.
*G06F 7/00* (2006.01)
*G06F 17/30* (2006.01)

(52) U.S. Cl.
USPC .......................................................... 707/740

(58) Field of Classification Search
USPC .......................................................... 707/740
See application file for complete search history.

(56) References Cited

U.S. PATENT DOCUMENTS

| 7,734,623 | B2 | 6/2010 | Witbrock et al. |
|---|---|---|---|
| 2002/0112035 | A1 | 8/2002 | Carey et al. |
| 2005/0027593 | A1 | 2/2005 | Wilson |
| 2006/0230053 | A1 | 10/2006 | Eldering |
| 2006/0294084 | A1 | 12/2006 | Patel et al. |
| 2007/0162505 | A1 * | 7/2007 | Cecchi et al. ............. 707/104.1 |
| 2008/0201206 | A1 | 8/2008 | Pokorney et al. |
| 2010/0145808 | A1 * | 6/2010 | Hilbert et al. ............. 705/14.66 |

FOREIGN PATENT DOCUMENTS

| WO | WO 00/28274 | 5/2000 |
|---|---|---|
| WO | WO 2007/135436 | 11/2007 |

OTHER PUBLICATIONS

Murray and Durrell, Inferring Demographic Attributes of Anonymous Internet Users, Abstract accessed online: Springerlink.com, Jan. 1, 2000.

* cited by examiner

*Primary Examiner* — Jacob F. Bétit
*Assistant Examiner* — Christy Lin
(74) *Attorney, Agent, or Firm* — Convergent Law Group LLP (57) ABSTRACT

The exemplary embodiments provide methods and systems for automatically identifying content related to an electronic text. Aspects of exemplary embodiments include linking topic categories, psychological states, demographic profiles, and additional content using one or more databases; in response to receiving content of an electronic text, analyzing by a software component executing on a computer the content and assigning one or more of topic categories to the content; automatically identifying at least one the psychological states of a user caused by the content and the demographic profiles whose members would be interested in the content that are linked to the one or more topic categories assigned to the content; and presenting a portion of the additional content that is linked to at least one of the identified demographic profiles and the psychological states.

4 Claims, 10 Drawing Sheets

Psychological State Map 24

| Generic Content Map 522 | | 530 | 532 Entities | 42 Psychological state (key) | 44 Need (1 to n) |
|---|---|---|---|---|---|
| 528 Generic Domain | Main Concepts | | | | |
| | | | | | |
| | | | | | |
| | | | | | |
| | | | | | |

Demographic Profile Table 22

| Enriched Content map 50 | 506 | 48 | | 510 | 514 |
|---|---|---|---|---|---|
| 38B Granular Topic Category | Sentiment | Other Attributes | Need | Dem. Profile (key) | Weight (0-1) |
| | | | | | |
| | | | | | |
| | | | | | |
| | | | | | |

Additional Content DB 26

| 540 Advertiser | 546 Advertisement | 40 Demographic Profile |
|---|---|---|
| | | |
| | | |
| | | |
| | | |

METHOD AND SYSTEM FOR AUTOMATICALLY IDENTIFYING RELATED CONTENT TO AN ELECTRONIC TEXT

BACKGROUND

Online advertising is becoming growingly more valuable and leading brands are increasing their budget to advertise on the Web. However, investing more in advertising does not mean automatically making more profit on the advertised products and services. If an ad is not related to the contents of the webpage where the ad is placed, reaching the desired target becomes more difficult.

Some conventional systems use keyword analysis to place advertisements. But such systems can be unreliable and imprecise, and the results can be insignificant or even counterproductive. For example consider a news article about a hurricane in the Caribbean. Based on keyword analysis, a conventional system may associate with that article an ad for a Caribbean vacation package, which could be counterproductive.

Accordingly, a need exists for a tool that processes the meaning of text to understand the interests and needs of readers of the text and automatically identify related content based on those interests and needs.

BRIEF SUMMARY

The exemplary embodiments provide methods and systems for automatically identifying content related to an electronic text. Aspects of exemplary embodiments include linking topic categories, psychological states, demographic profiles, and additional content using one or more databases; in response to receiving content of an electronic text, analyzing by a software component executing on a computer the content and assigning one or more of topic categories to the content; automatically identifying at least one the psychological states of a user caused by the content and the demographic profiles whose members would be interested in the content that are linked to the one or more topic categories assigned to the content; and presenting a portion of the additional content that is linked to at least one of the identified demographic profiles and the psychological states.

According to the method and system disclosed herein, the exemplary embodiment processes the meaning of the text to understand the interests and needs of readers of the text and automatically identifies related content based on those interests and needs as identified in selected demographic profiles and/or psychological states.

DETAILED DESCRIPTION

The exemplary embodiment relates to automatically identifying content related to an electronic text. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide a method and system for automatically identifying content related to an electronic text based on a contextual taxonomy, a psychological state of a reader caused by the content and demographic profiles of readers. The system analyzes and automatically identifies the topic categories discussed in the electronic text, and by interacting with an additional content database, such as an advertising database, selects the most relevant content, such as ads, to be displayed with the text through identification of psychological state of a reader caused by the text and demographic profiles that would be interested in the content, thereby offering highly related content to the reader.

Figure 1A:
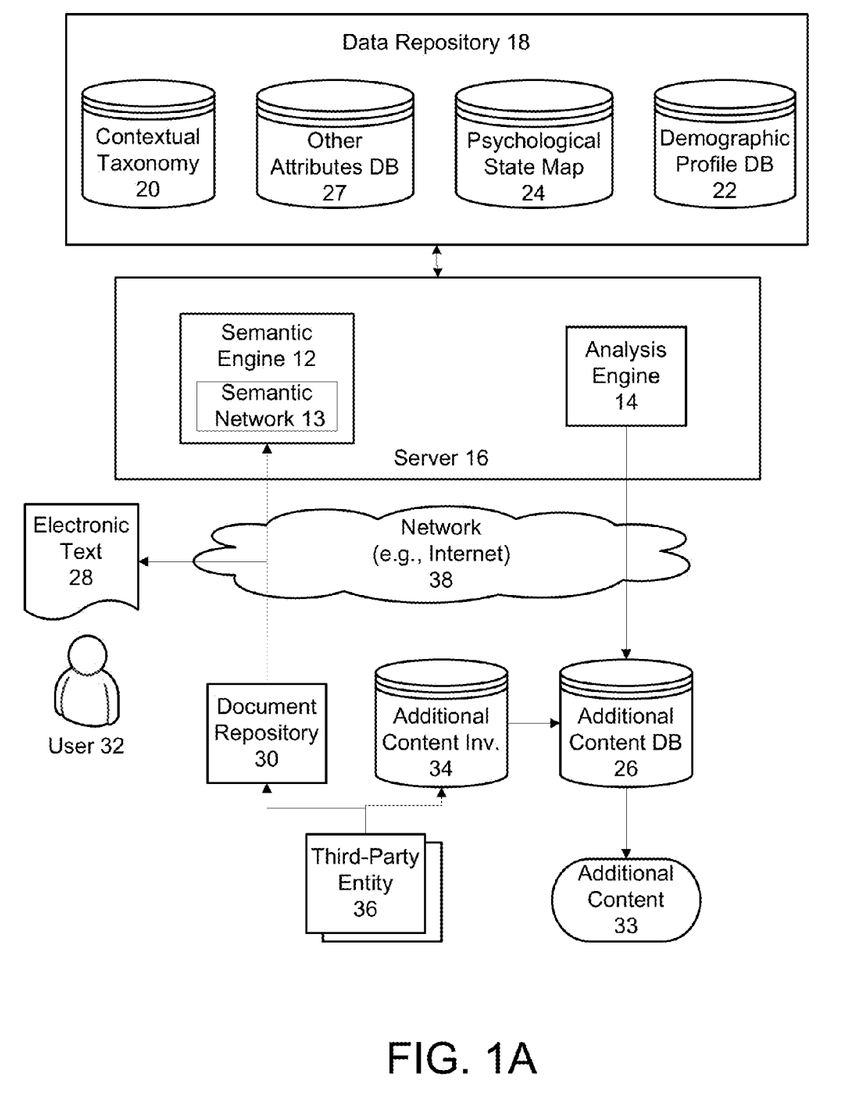
FIGS. 1A and 1B are diagrams illustrating embodiments of a semantic advertiser system 10 for automatically identifying a demographic profile and psychological state of a reader of electronic text.

FIG. 1A is a diagram illustrating one embodiment of a semantic advertiser system 10 that automatically identifies content related to an electronic text. The semantic advertiser system 10 may include a semantic engine 12 and an analysis engine 14 executing on a server 16, and a data repository 18. The data repository 18 may comprise a content taxonomy 20, a demographic profile database 22, a psychological state map 24, and an additional attributes database 27. The semantic advertiser system 10 may also utilize an additional content database 26 and an additional content inventory 34 that in one embodiment may be controlled or operated by a third party entity 36.

In one embodiment, the contextual taxonomy 20 may be structured as a hierarchy of topic categories found in text. The contextual taxonomy 20 may be used by the semantic engine 12 to classify content of an electronic text 28 into one or more topic categories based on the contextual taxonomy 20. In one embodiment, the contextual taxonomy 20 may be optimized for a particular type of electronic text content, and the semantic advertiser service 10 may include multiple versions of the contextual taxonomy 20, each optimized for different types of electronic texts 28. In one embodiment, the contextual taxonomy 20 may link generic topic categories in the form of domains and/or concepts from a semantic network 13 to one or more granular topic categories contained in the contextual taxonomy 20.

The additional attributes database 27 may include attributes that can be associated with particular granular topic categories or entities such as people, organizations, geographic location, and sentiment. For instance, example attributes that may be associated with a concept of "President", for example, may include "Success", "mediocre" and "failure".

The psychological state map 24 may include a plurality of records representing human mental states and attributes thereof. The psychological state map 24 may map each psychological state contained therein to a set of psychological state needs, which are wants or desires stemming from the corresponding psychological state. In one embodiment, the psychological state map 24 may link generic topic categories in the form of domains and/or concepts from the semantic network 13 to one or more psychological states contained in the psychological state map 24.

The demographic profile database 22 may include plurality of demographic profiles, each of which represents a subgroup of a population and that includes information about members of the subgroup that may be useful for marketing purposes. In one embodiment, the demographic profile database 22 may link of one or more of the granular topic categories from the contextual taxonomy 20 to predetermined demographic profiles from the demographic profile database 22. In this embodiment, each of the demographic profiles may include a weight indicating a level of relative importance of the demographic profile to the granular topic categories among other attributes, and each of the demographic profiles may further include a link to a set of profile needs that signify wants or desires of the members of the corresponding demographic profile.

The additional content database 26 may be populated with content that can be associated with the electronic text 28 based on the outcome of the semantic analysis performed by the semantic advertiser service 10.

The server 16 may be configured to receive as input the electronic text 28. In one embodiment, the electronic text 28 may comprise a web page from a document repository 30. In one embodiment, the document repository 30 may represent a web server and/or a database containing electronic texts 28 such as web pages. In another embodiment, the document repository may represent any type of electronic storage suitable for storing electronic texts 28 containing textual information in any type of digital file format. In one embodiment, example types of electronic texts may include documents in which additional content, such as advertisements, may be displayed including web pages, articles, blogs, publications, e-mails, text messages, tweets, and the like. In one embodiment, the electronic text 28 may be served simultaneously to both the semantic advertiser service 10 and to a user 32 (e.g., a web surfer) via an electronic device display (not shown). In one embodiment, the document repository 30 may be provided by a third party entity 36.

In one embodiment, the semantic advertiser system 10 may be used to identify topic categories included in the input electronic text 28, and automatically identify a psychological state of the user 32 caused by the content of the electronic text 28 and a demographic profile that would find the content relevant. The identified demographic profile and the psychological state of the user, one or both of which may be associated with a hierarchy of needs, may then be used to present the user with additional content 30 specifically targeted to addressing needs associated with the psychological state and/or the demographic profile of the user at that moment.

In another embodiment, the semantic advertiser system 10 may be used by the third party entity 36 to identify demographic profiles and psychological states of potential readers of the electronic text 28 to select additional content 33 related to the electronic text 28 that would derive the maximize income from placement of the additional content 30. The server 16 may also be configured to access or receive an additional content inventory 34. The additional content inventory 34 may comprise advertisements or other content that can be related to the content of the electronic text 28. The additional content inventory 34 may be used to populate the additional content database 26 and may also be provided by the same or different third party entity 36. In one embodiment, the third party entity 36 may represent a content publisher, an advertiser or an ad agency, for example. In one embodiment, third-party entity 36 may make the additional content inventory 34, the additional content database 26 and/or the document repository 30 available to the semantic advertiser service 10 via a network 37 (e.g., the Internet) for automatic placement of ads within the electronic text(s) 28.

In an alternative embodiment, the semantic advertiser service 10 may be implemented as a desktop application that runs on a PC. In this case, the electronic text 28 and the additional content inventory 34 may be obtained from an internal or external drive of the PC, or an external server, or a combination thereof.

The server 16 may include hardware components of typical computing devices (not shown), including a processor, input devices (e.g., keyboard, pointing device, microphone for voice commands, buttons, touchscreen, etc.), output devices (e.g., a display device, speakers, and the like). The server 16 may include computer-readable media, e.g., memory and storage devices (e.g., flash memory, hard drive, optical disk drive, magnetic disk drive, and the like) containing computer instructions that implement the functionality disclosed when executed by the processor. The server 16 may further include wired or wireless network communication interfaces for communication. Although the server 16 is shown as a single computer, it should be understood that the functions of server 16 may be distributed over more than one server, and the functionality of software components may be implemented using a different number of software components.

Although the semantic engine 12 and an analysis engine 14 are shown as software components, in another embodiment the semantic engine 12 and the analysis engine 14 may be implemented in hardware. In addition, the functionality of the semantic engine 12 and the analysis engine 14 may be combined into a lesser or greater number of modules/components that are run on any type of computing device.

Figure 2:
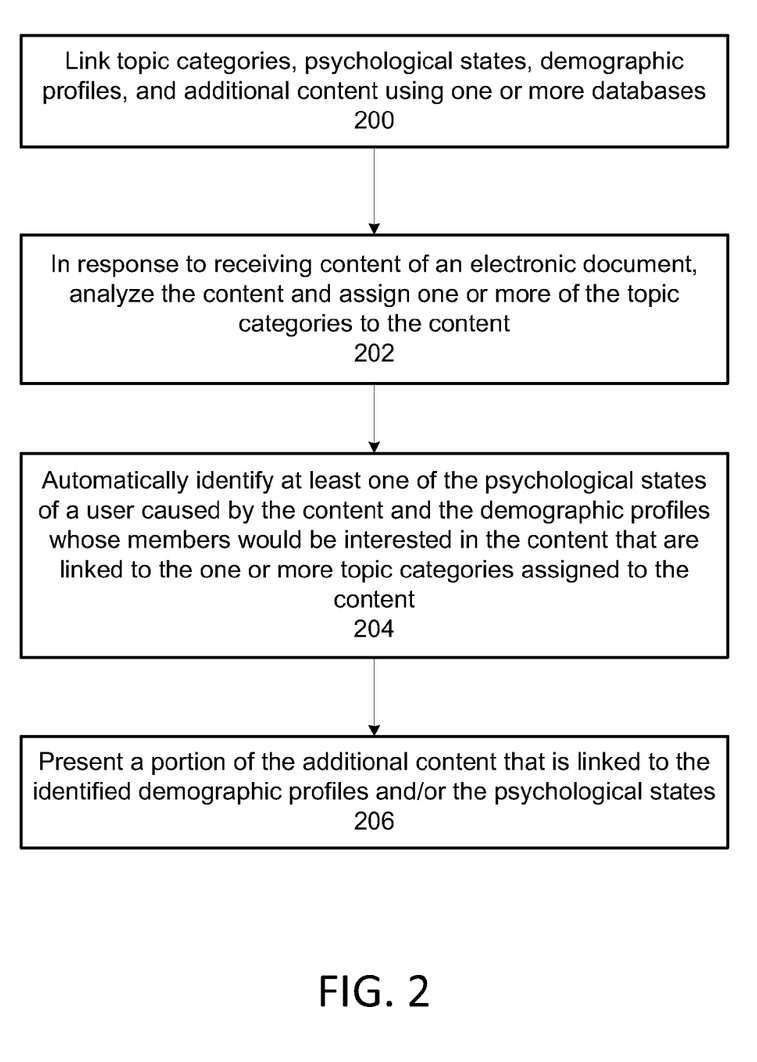
FIG. 2 is a flow diagram illustrating one embodiment a process for automatically identifying content related to an electronic text.

FIG. 2 is a flow diagram illustrating one embodiment of a process for automatically identifying content related to an electronic text. The process may include linking the topic categories, the psychological states, the demographic profiles, and the additional content using one or more databases (block 200). In one embodiment, the topic categories, the psychological states 42, the demographic profiles 40, and the additional content are linked via the contextual taxonomy 20, the demographic profile database 22, the psychological state map 24, and the additional content database 26, as described in various embodiments further below.

In response to receiving content of an electronic text 28, the semantic advertiser system 10 analyzes the content and assigns one or more of the topic categories to the content (block 202).

Figure 1B:
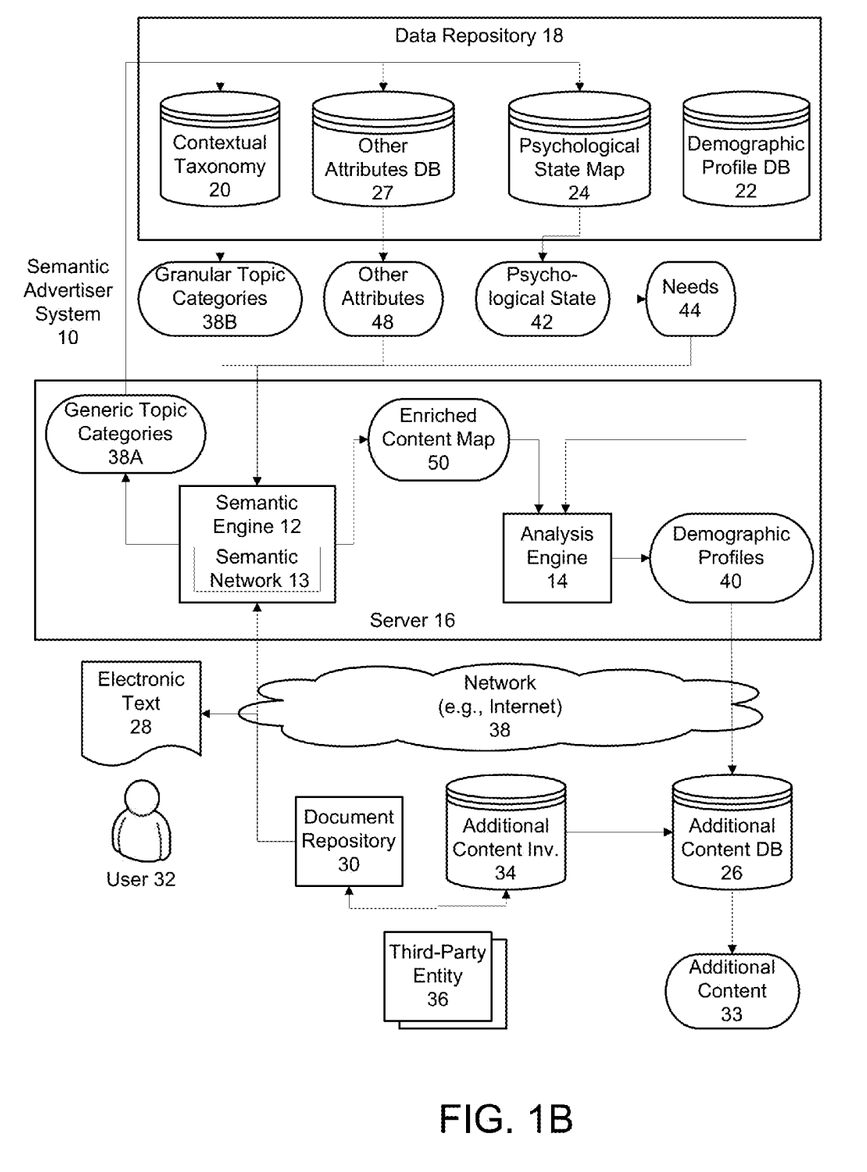

According to one exemplary embodiment, the semantic advertiser system 10 may provide different levels of topic categories to enable deeper understanding of the electronic text 28, as shown in FIG. 1B.

FIG. 1B is a diagram illustrating one embodiment of a semantic advertiser system 10 in further detail. In this embodiment, the semantic engine 12 may generate both generic topic categories 38A from the semantic network 13 and granular topic categories 38B from the contextual taxonomy 20. In one embodiment, the semantic engine 12 may perform the semantic analysis on the content using the semantic network 13 and assign generic topic categories 38A identifying generic domains, main concepts, and entities included in the electronic text 28. The semantic network 13 may be implemented as described in U.S. Pat. No. 7,899,666 B2 entitled "Method And System For Automatically Extracting Relations Between Concepts Included In Text" issued Mar. 1, 2011, and incorporated herein by reference.

In one embodiment, the extracted generic domains, main concepts, and entities may form a generic content map for the electronic text 28 that is used to access the contextual taxonomy 20, the other attributes database 27, and the psychological state map 24. The semantic engine 12 may use the generic content map to automatically identify granular topic categories 38B from the contextual taxonomy 20, as well as other attributes 48 from the other attributes database 27 that are included in the input electronic text 28.

As an example, assume the semantic engine 12 analyzes an article about Barack Obama throwing out a first pitch at a major league baseball game. The generic topic categories 38A returned from the semantic network 13 may include a generic domain of "sport" and main concepts of "President", "Barack Obama", "MLB", "game", the like. The granular topic categories 38B returned from the contextual taxonomy 20, however, may be more specific, such as "Baseball.Exhibition.Game" and "Politics. Internal-affair".

The generic topic categories 38A and the granular topic categories 38B may be collectively referred to as topic categories 38.

Referring again to FIG. 2, the semantic advertiser system 10 automatically identifies at least one of the psychological states 42 of a user caused by the content and the demographic profiles 40 whose members would be interested in the content that are linked to the one or more topic categories 38 assigned to the content (block 204). As used herein, identifying at least one of the demographic profiles 40 and at least one of the psychological states 42 may mean identifying at least one of the demographic profiles 40 only; identifying at least one of the psychological states 42 only; or identifying at least one of each.

The semantic advertiser system 10 then presents a portion of the additional content that is linked to the identified demographic profiles 40 and/or the psychological states 42 (block 206). In one embodiment, the additional content 33 may be presented by displaying the additional content 33 within, or in association with, the electronic text 28 in real-time. In another embodiment, presenting may include providing a pointer (e.g., a URL) to the additional content 33. Although in one embodiment, the additional content 33 comprises advertisements, the additional content 33 may comprises other types of media including, articles, maps, pictures and videos, for example.

As an example of the operation of the semantic advertiser system 10 consider the example of the news article about a hurricane in the Caribbean. Based on the semantic analysis, the semantic advertiser system 10 may determine that generic topic categories 38A are "weather" and "Islands", while granular topic categories 38B of the article are "hurricanes", "disaster", and "Caribbean, for example. Based on these topic categories 38, the analysis engine 14 may determine that a demographic profile whose members are ages 35-55 would be interested in such content, and that the news article may generate in those users psychological states 42 of "fear" and "concern", for instance. Rather than incorrectly associating the news article with an ad for a Caribbean vacation package, which could be counterproductive, the semantic advertiser system 10 may find ads that are linked to the identified demographic and/or the psychological states, such as an ad for hurricane insurance, for example.

According to one embodiment, one or both of the demographic profiles 40 and the psychological states 42 may be linked to the additional content based on needs. For example, one or both of the of the demographic profiles 40 in the demographic profile database 22 and the psychological states 42 in the psychological state map 24 may be linked to a set of needs that are required or wanted by the corresponding demographic profile and/or psychological state, as determined on a behavioral study for instance. The set of needs linked to each of the demographic profiles 40 may be the same or different than the set of needs linked to each of the psychological states 42. One or both sets of profile needs and state needs may then be linked to the contents in the additional content database 26. Once the demographic profiles 40 and/or the psychological states 42 are associated with the electronic text 28 based on the assigned topic categories 38, the additional content 33 related to the electronic text 28 can be identified based in part on the needs.

Referring again to the exemplary embodiment of FIG. 1B, after using the generic topic categories 38A or the generic content map to query the contextual taxonomy 20, the other attributes database 27, and the psychological state map 24, the semantic engine 12 may create an enriched content map 50 containing extracted granular topic categories 38B, other attributes 48, and needs 510. At least a part of the enriched content map 50, such as the needs 510, may be used by the analysis engine 14 to identify a demographic profile 40 from the demographic profile database 22, which in turn, may be used to present the user 32 with additional content 33 from the additional content database 26 specifically targeted to addressing the needs 510 associated with the demographic profile 40 of the user 32 at that moment.

In the example above where the demographic profile ages 35-55 and the psychological states "fear" and "concern" were identified, assume that example needs that are associated with the demographic profile and the psychological states include "insurance" and "safety". In one embodiment, these same needs could be associated with a weight or score indicating a measure of importance to those needs with a particular demographic profile and that demographic profile may be used to query the additional content database 26 to find ads linked with that demographic profile. In another embodiment, these needs could be linked to the ads for insurance, such as the ad for hurricane insurance and, the needs associated with demographic profile and/or the psychological states may be used to extract ads with these same or similar needs.

The semantic advertiser system 10 that links document content not only to demographic profiles, but also to cultural or psychological states offers several advantages over conventional ad placement systems. For content publishers, the semantic advertiser system 10 provides increased visibility of their content through real-time monitoring and detailed analysis of their electronic texts. As a result ads are more relevant and publishers can generate increased revenue. The semantic advertiser system 10 offer advertisers and advertising agencies the ability to reach target demographics more effectively by providing precise, real-time information about the content of an electronic text so more relevant ads can be published, resulting in a higher return on investment. And for the user 32, the system 10 presents highly relevant advertisements that are directly linked to the user's needs as determined by the user's psychological state caused by reading the electronic text 28.

Figure 3A:
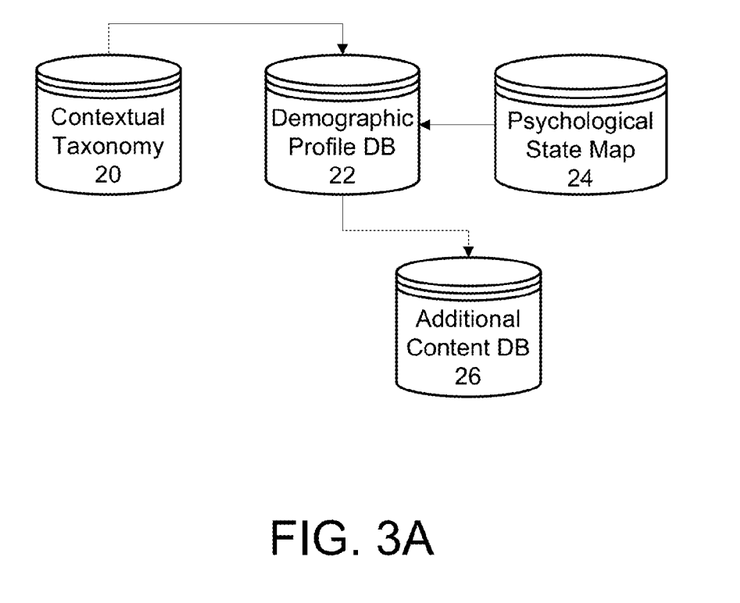
FIGS. 3A-3D are block diagrams illustrating three embodiments for linking topic categories, psychological states, demographic profiles, and additional content using one or more databases.

FIGS. 3A-3D are block diagrams illustrating three embodiments for linking topic categories 38, psychological states 42, demographic profiles 40, and additional content 33 using one or more databases. FIG. 3A depicts a first embodiment in which the granular topic categories 38B from the contextual taxonomy 20 are linked to the demographic profiles 40 in the demographic profile database 22. The psychological states 42 in the psychological state map 24 are linked to the demographic profiles 40 in the demographic profile database 22. And the demographic profiles 40 are then linked to the additional content 33 in the additional content database 26. This is the embodiment shown in FIG. 1B.

Figure 3B:
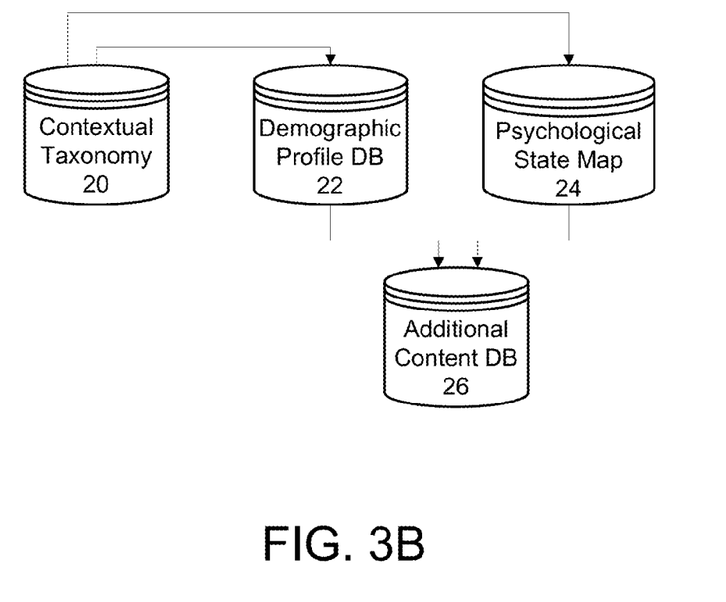

FIG. 3B depicts a second embodiment in which the granular topic categories 38B from the contextual taxonomy 20 are linked to both the demographic profiles 40 in the demographic profile database 22 and the psychological states 42 in the psychological state map 24. One or both of the demographic profiles 40 and psychological states 42 may then be linked to the additional content 33 in the additional content database 26.

Figure 3C:
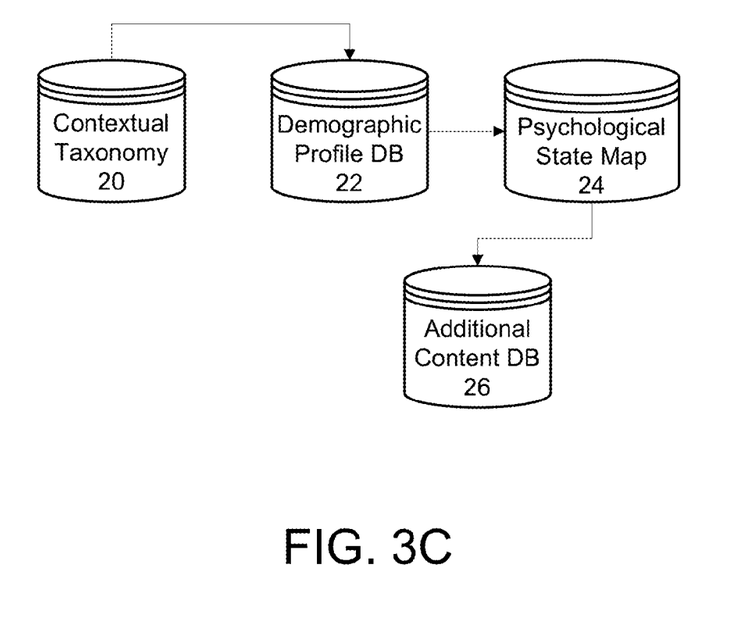

FIG. 3C depicts a third embodiment in which the granular topic categories 38B from the contextual taxonomy 20 are linked only to the demographic profiles 40 in the demographic profile database 22. The demographic profiles 40 are linked to the psychological states 42 in the psychological state map 24. And the psychological states 42 are linked to the additional content 33 in the additional content database 26.

Figure 3D:
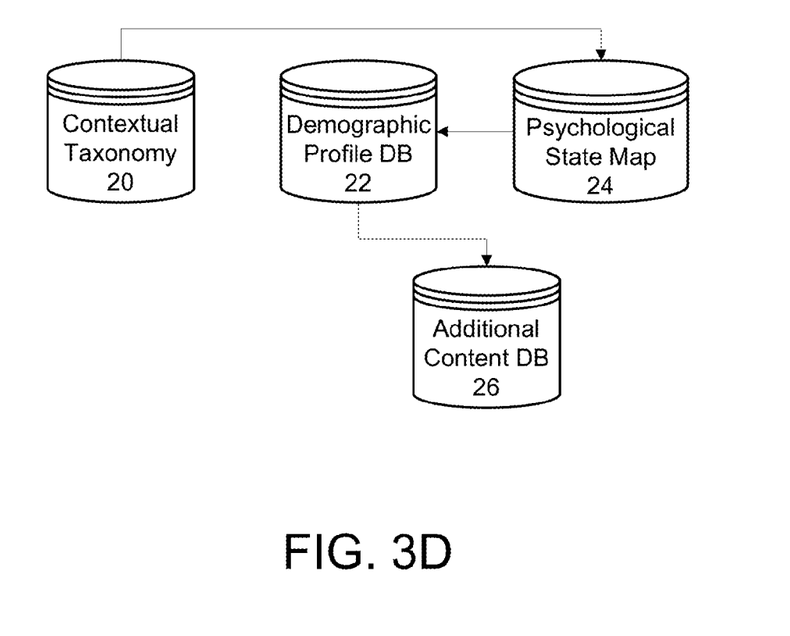

FIG. 3D depicts a fourth embodiment in which the granular topic categories 38B from the contextual taxonomy 20 are linked only to the psychological states 42 in the psychological state map 24. The psychological states 42 are linked to the demographic profiles 40 in the demographic profile database 22. And the demographic profiles 40 are linked to the additional content 33 in the additional content database 26.

Figure 4:
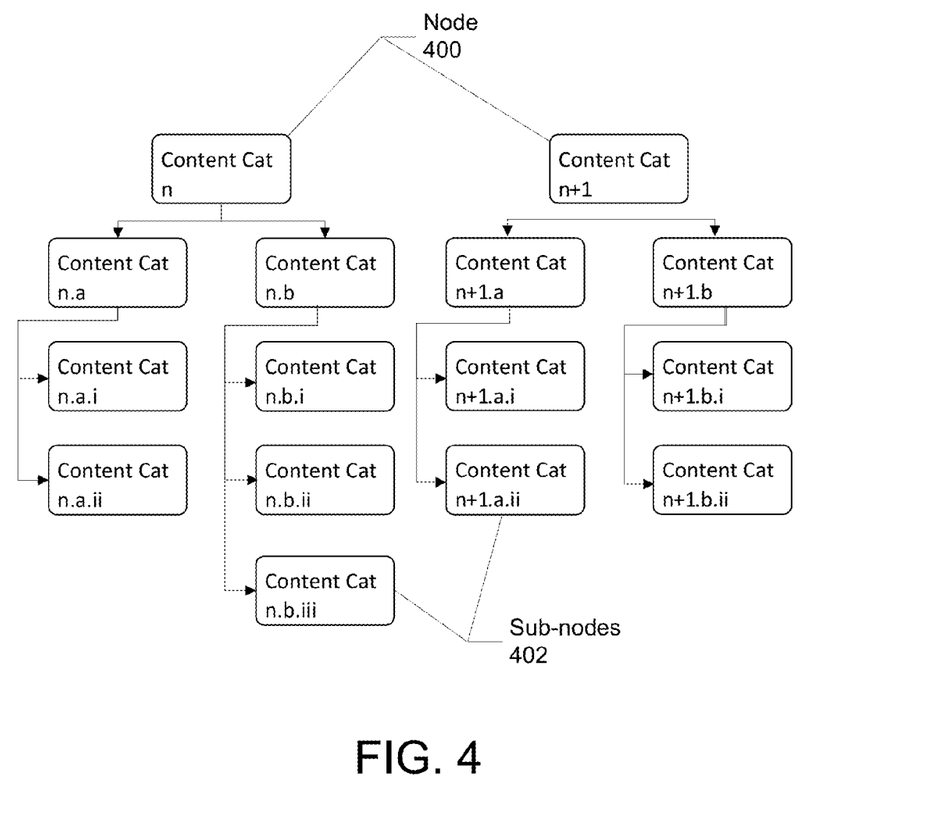
FIG. 4 is a block diagram graphically illustrating contents of the contextual taxonomy.

FIG. 4 is a block diagram graphically illustrating contents of the contextual taxonomy 20. The contextual taxonomy may be a lexical database organized on a conceptual base (rather than alphabetical order as a dictionary). The contextual taxonomy 20 may include a hierarchy of individual nodes 400 or records representing granular topic categories 38B, where each node 400 is linked to zero-to-n sub-nodes 402 (e.g., sub-categories), which may turn can have 0-to-n sub-nodes.

Figure 5:
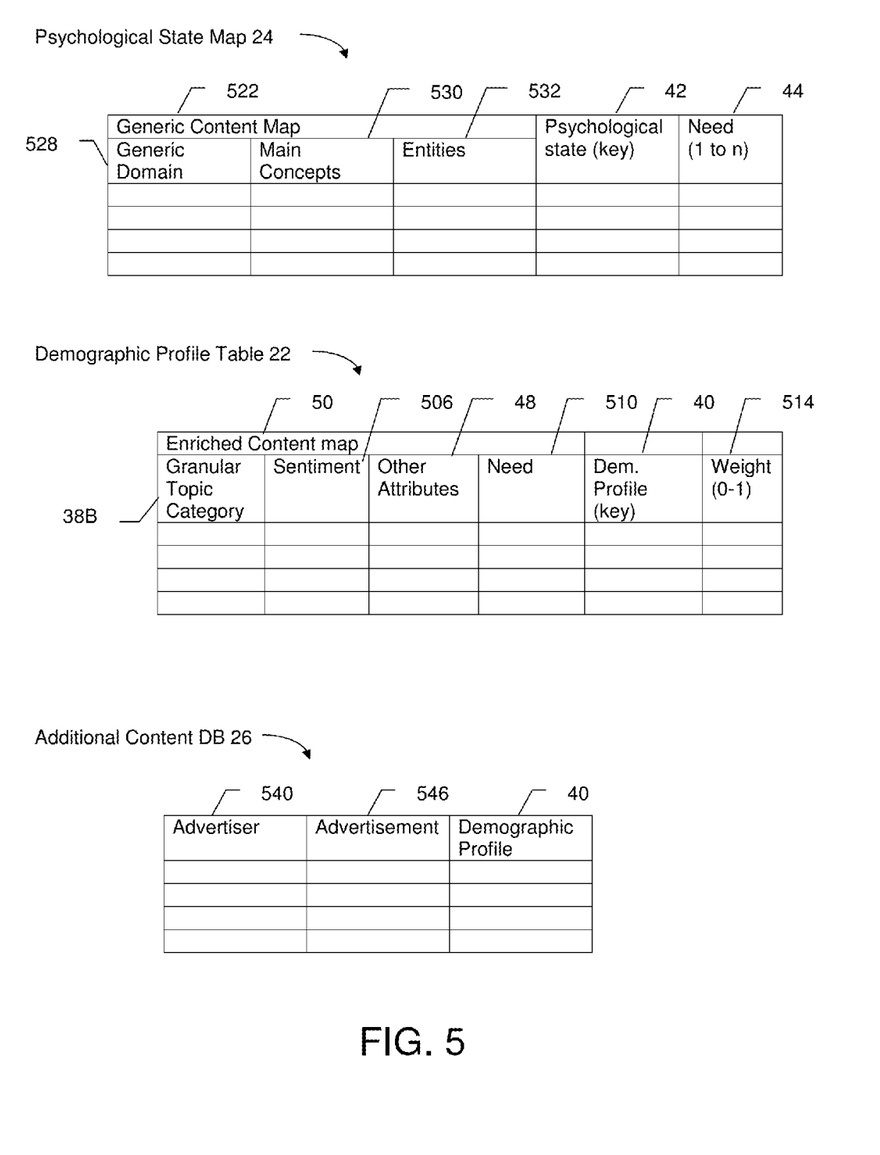
FIG. 5 is a diagram illustrating an example database schema according to the first embodiment.

FIG. 5 is a diagram illustrating an example database schema according to the first embodiment of FIGS. 1B and 3A, where like components have like reference numerals. The database schema includes the psychological state map 24, the demographic profile table 22, and the additional content database 26.

The psychological state map 24 may be used to link the generic topic categories 38A, also referred to as the generic content map 522, to psychological states 42. In one embodiment, for each psychological state 42, the generic content map 522 comprises a specific combination of one or more generic domains 528, main concepts 530, and entities 532. Each of the psychological states 42 may also be linked to a set of 1-n needs 44, where each need 44 may indicate a requirement or want of a person in the corresponding psychological state 42.

The psychological state map 24 may be used to identify for the electronic text 28, or a page thereof, a psychological state 42 generated in the reader based on a specific combination of generic domains 528, main concepts 530, and entities 532 generated from the electronic text 28. The 1-m needs 44 linked to each psychological state 42 may then be used to extract the demographic profile(s) 40 more prone to react to the need(s) 44.

The demographic profile table 22 may be used to link one or more granular topic categories 38B from the contextual taxonomy 20 to predetermined demographic profiles 40. In one embodiment, the demographic profile table 22 may be created or provided by the third party entity 36. Each record in the demographic profile table 22 may include the following fields: an enriched content map 50, a demographic profile 40, and a weight 514.

The enriched content map 50 may include a granular topic category 38B, a sentiment 506, other attributes 48, a set of 1-n needs 510, where each need 510 indicates a requirement or want of the corresponding demographic profile 40. The records in the demographic profile table 22 may link demographic profiles 40 to a specific combination of one or more granular topic categories 38B, a sentiment 506, other customizable attributes 48, and the needs 510 in the enriched content map 50. The sentiment 506 may be a demographic profile's attitude towards the corresponding granular topic category 38B based mainly on emotions instead of reason (e.g., positive, neutral, negative).

The weight 514 associated with each of the demographic profiles 40 may indicate a level of relative interest or importance of the corresponding enriched content map 50, particularly the granular topic category 38B, to the demographic profile 40 and the needs 510. The demographic profile table 22 may be used to measure how relevant the electronic text 28, or a specific page thereof, is for each demographic profile 40, allowing a sort the demographic profiles 40 based on how relevant the electronic text 28 (e.g., a website page) is for the specific demographic profile 40.

In one embodiment, the set of needs 510 associated with the demographic profiles 40 may be the same as the set of needs 44 associated with the psychological states 42. In another embodiment, the set of needs 510 associated with the demographic profiles 40 may be different than the set of needs 44 associated with the psychological states 42, but the two set of needs 510 and 44 may overlap.

The additional content database 26 may comprise an inventory of additional content, such as advertisements, that is linked to the demographic profiles 40 and that may be indirectly linked to the psychological states 42. In one embodiment, the additional content database 26 may include the following fields: an advertiser 540, an advertisement 546, and a demographic profile 40. The advertiser 540 may comprise an identification of an advertiser who is supplying the advertisement 546, which may be in the form of the actual advertisement or a pointer to a storage location of the advertisement.

In a further embodiment, each of the records in the additional content database 26 may further include need (not shown). These needs 44 may correspond to the needs 44 from the psychological state table 24 and/or to the needs 510 from the demographic profile table 22, allowing further flexibility in how the additional content database 26 is accessed. Thus, in one embodiment, the additional content database 26 may link additional content 33 such as advertisements 546, to both the demographic profiles 40 and the needs 44 that address the psychological states 42 of the reader, for instance.

Figure 6:
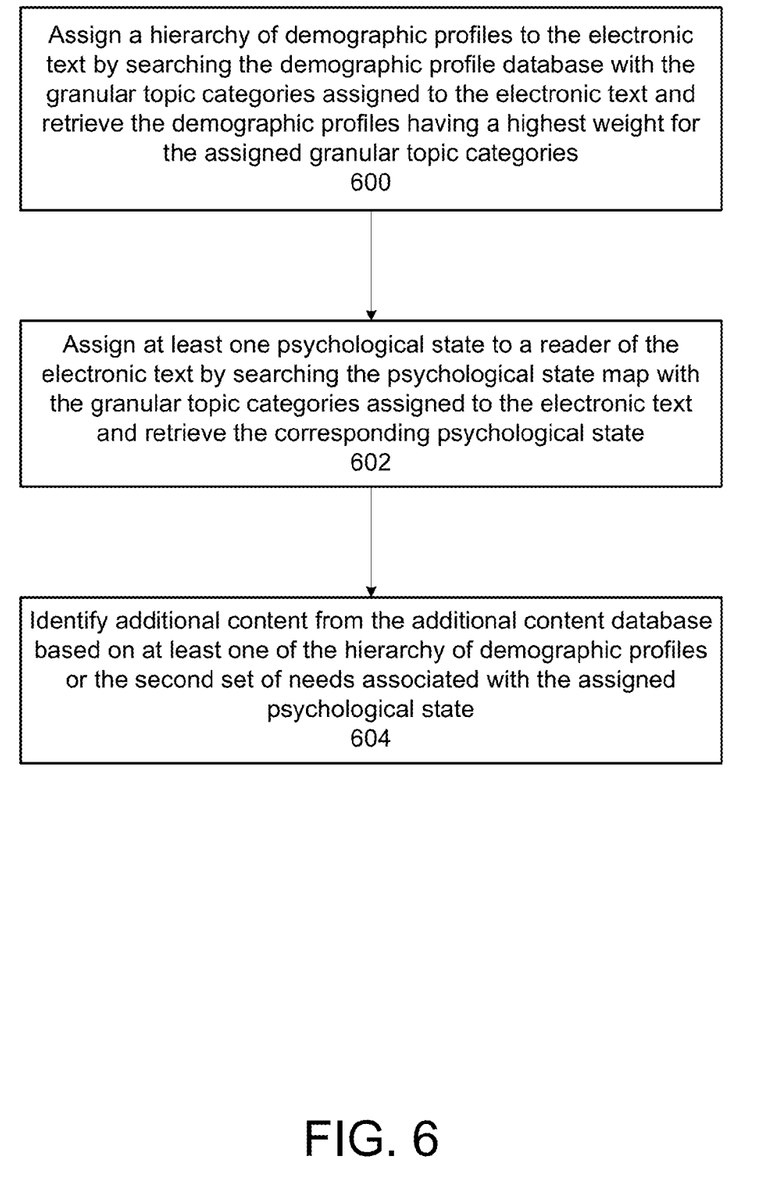
FIG. 6 is a diagram illustrating a process of automatically identifying content related to an electronic text in accordance with the first embodiment.

FIG. 6 is a diagram illustrating a process of automatically identifying content related to an electronic text in accordance with the embodiment shown in FIG. 3B. As described in the embodiment of FIG. 3B, one or more granular topic categories 38B from the contextual taxonomy 20 are linked to predetermined demographic profiles 40 to psychological states 42; and one or both of the demographic profiles 40 and the psychological states 42 are linked to the additional content.

Referring to FIGS. 3B, 5 and 6, in response to the semantic engine 12 analyzing the electronic text 28 based on the contextual taxonomy 20 and assigning one or more of the granular topic categories 38B to the electronic text 28, the analysis engine 14 assigns a hierarchy of demographic profiles 40 to the electronic text by searching the demographic profile database 22 with the granular topic categories 38B assigned to the electronic text 28 and retrieving the demographic profiles 40 having a highest weight 514 for the assigned granular topic categories 38B (block 600). The analysis engine 14 may also retrieve the needs 510 and weights 514 of the retrieved demographic profiles 40 from Table 2. In one embodiment, the semantic advertiser system 10 may use the enriched content map 50 generated for the input electronic text 28 to search the demographic profile table 22 and identify a corresponding demographic profile 40.

The analysis engine 14 may assign at least one psychological state 42 to a reader of the electronic text 28 by searching the psychological state map 24 with the granular topic categories 38B assigned to the electronic text 28 and retrieving the corresponding psychological state 42 (block 602). The analysis engine 14 may also retrieve the needs 44 of the retrieved psychological state 42. In one embodiment, the semantic advertiser system 10 may use the enriched content map 50 generated for the input electronic text 28 to search the psychological state map 24 and identify a psychological state generated in a reader corresponding to the content map.

The analysis engine 14 may identify additional content 33 from the additional content database 26 based on at least one of the hierarchy of demographic profiles 40 or the set of needs 44 associated with the assigned psychological state 42 (block 604).

The additional content 33 may be identified using several embodiments. In one embodiment, the demographic profile 40 field of the additional content database 26 may be searched with one of the demographic profiles 40 retrieved from the demographic profile table 500 to retrieve one or more corresponding advertisements 546. In this embodiment, the needs 44 associated with the retrieved psychological state 42 may be used to extract the demographic profiles more prone to react to the needs, as indicated by the weights 514 associated with the demographic profile needs 510.

In another embodiment where there is a needs field associated with the additional content database 26, the additional content database 26 may be searched with the set of needs 44 associated with the psychological state 42 to retrieve one or more corresponding advertisements 546. This embodiment enables the system to work in the absence of available demographic profiles 40.

In yet another embodiment, the analysis engine 14 may consider the demographic profiles 40, when available, to rank the needs 44 associated with the retrieved psychological states 42 prior to fetching the additional content using the needs 44.

Figure 7:
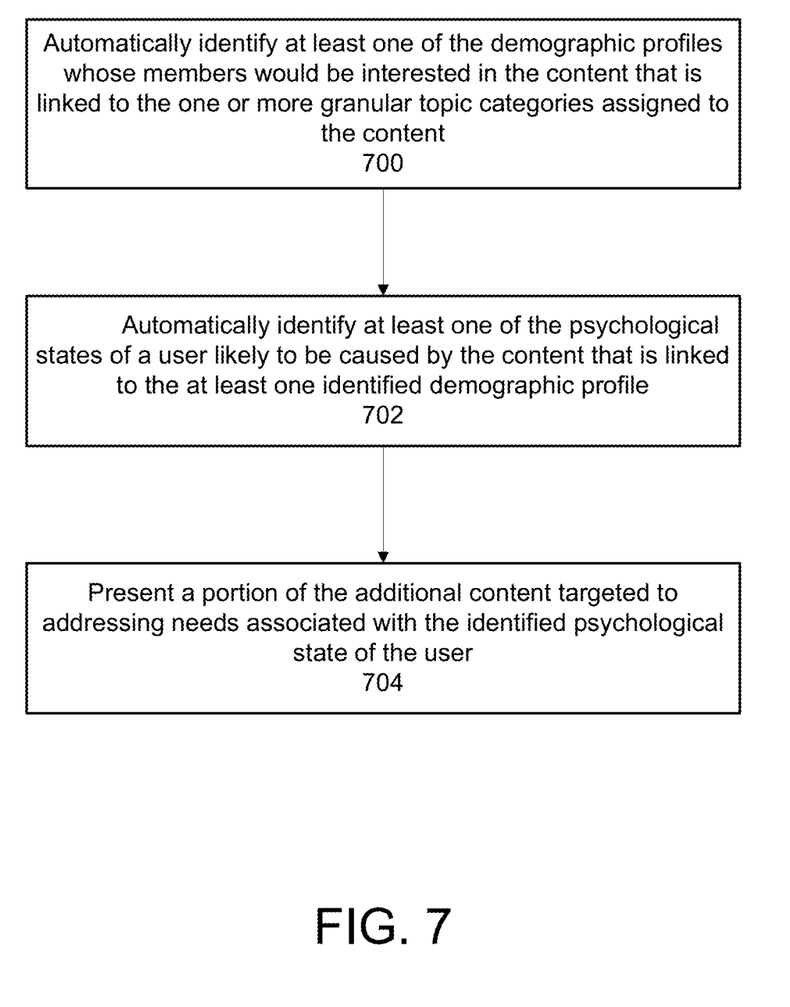
FIG. 7 is a diagram illustrating a process of automatically identifying content related to an electronic text in accordance with the second embodiment.

FIG. 7 is a diagram illustrating a process of automatically identifying content related to an electronic text in accordance with the embodiment of FIG. 3C. As described in the embodiment of FIG. 3D, one or more granular topic categories 38B from the contextual taxonomy 20 are linked to the demographic profiles 40; the demographic profiles 40 are linked to psychological states 42; and at least the psychological states 42 are linked to the additional content.

Referring to FIGS. 3C and 7, in response to the semantic engine 12 analyzing the electronic text 28 based on the contextual taxonomy 20 and assigning one or more of the granular topic categories 38B to the electronic text 28, the analysis engine 14 automatically identifies at least one of the demographic profiles 40 whose members would be interested in the content that is linked to the one or more granular topic categories 38B assigned to the content (block 700). The analysis engine 14 automatically identifies at least one of the psychological states 42 of a user 32 likely to be caused by the content that is linked to the at least one identified demographic profile (block 702). And the analysis engine 14 presents a portion of the additional content 33 targeted to addressing needs associated with the identified psychological state of the user 32 (block 704).

Figure 8:
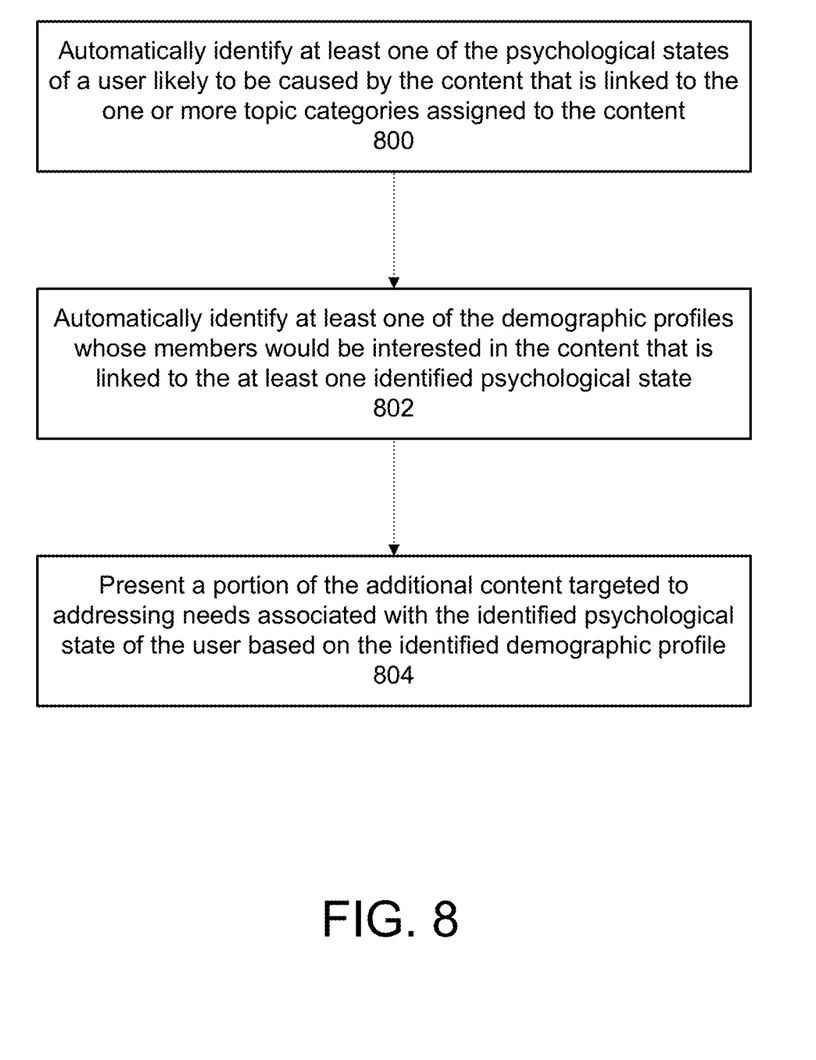
FIG. 8 is a diagram illustrating a process of automatically identifying content related to an electronic text in accordance with the third embodiment.

FIG. 8 is a diagram illustrating a process of automatically identifying content related to an electronic text in accordance with the embodiment of FIG. 3D. As described in the embodiment of FIG. 3D, one or more granular topic categories 3B from the contextual taxonomy 20 are linked to the psychological states; the psychological states are linked to the demographic profiles; and the demographic profiles are linked to the additional content.

Referring to FIGS. 3D and 8, in response to the semantic engine 12 analyzing the electronic text 28 based on the contextual taxonomy 20 and assigning one or more of the granular topic categories 38B to the electronic text 28, the analysis engine 14 automatically identifies at least one of the psychological states 42 of a user 32 likely to be caused by the content that is linked to the one or more granular topic categories 38B assigned to the content (block 800). The analysis engine 14 automatically identifies at least one of the demographic profiles whose members would be interested in the content that is linked to the at least one identified psychological state (block 802). And the analysis engine 14 automatically presents a portion of the additional content 33 targeted to addressing needs associated with the identified psychological state of the user 32 based on the identified demographic profile (block 804).

As will be appreciated, in the embodiments described herein, the generic topic categories 38A may be used to access the demographic profile database 22 and/or the psychological state map 24 instead of, or in addition to, the granular topic categories 38B.

The operation of the semantic advertiser system 10 will be further described with respect to the example described above of a web article regarding President Obama throwing a first pitch at a major league baseball game. As previously discussed, in response to processing the content of the article the semantic engine 12 may, among other things, generate a generic content map 522 as follows:

Generic Domain 528: Sport

Main Concepts 530: Barack Obama, pitch, Albert Pujol, MLB, game, crowd

Entities 532:
People: Barack Obama, Albert Pujol, Jim McGraver
Organization: MLB, American League, National League
Geographic Location Saint Louis
Sentiment: positive At this point, the generic content map 522 is used as input to the data repository 18 to:

- access the contextual taxonomy 20 and build the enriched content map 50 by associating to the article more granular topic categories 38B (e.g., from sport to baseball.exhibition.game and politics.internal-affair)
- use the elements from the generic content map 522 to access the additional attribute databse 27 (e.g., Barack Obama is a symbol of success, MLB of tradition, Saint Louis of middle America values (or jazz) etc.). These other attributes 48 (success, tradition) are included in the enriched content map 50
- use the generic content map 522 to access the psychological state map 24 to extract the psychological states 42 of a reader (i.e. enjoyment, nostalgia) and the related needs 44 (eg., entertainment, coziness, family-love etc.)

After this process, the enriched content map 50 may be used by the analysis engine 14 to query the demographic profile database 22 and retrieve the demographic profiles 40 having the highest weights 514 measuring the relative importance or relevancy of the content in the text 28 for each demographic profile 40.

The output of the semantic advertiser system 10 is a hierarchy of demographic profiles 40 that fit the content of the text 28. This hierarchy of demographic profiles 40 can be used to access the additional content database 26 or even the additional content inventory 34. Either of these may be a third party inventory DB, such as GOOGLE ADSENSE. In this way, the semantic advertiser system 10 can improve the performance of other ad distribution servers, where the demographic profiles 40 or even the psychological state are the keywords the advertisements are associated with.

The value for an advertiser is that instead of buying the keyword "baseball", the advertiser can buy the following output demographic profiles: a demographic profile of "70+ year old men" that is triggered only when the topic category "baseball" is associated with psychological state of "nostalgia", for example, and the demographic profile of "40 year old high income" that is triggered when the text 28 is associated with the attribute "success", for example.

A method and system for automatically identifying content related to an electronic text has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A computer-implemented method for automatically identifying content related to an electronic text, comprising:
   - linking topic categories, psychological states, demographic profiles, and additional content using one or more databases, wherein the topic categories comprise generic and granular topic categories, each of the psychological states including a link to a first set of needs, and each of the demographic profiles further including a link to a second set of needs;
   - in response to receiving content of the electronic text, analyzing by a software component executing on a computer the content and assigning one or more of the topic categories to the content;
   - assigning at least one of the psychological states to a reader of the electronic text by searching a psychological state map with the generic topic categories assigned to the electronic text and retrieving the corresponding psychological state;
   - assigning a hierarchy of the demographic profiles to the electronic text by searching a demographic profile database with the granular topic categories assigned to the electronic text, each of the demographic profiles having a weight indicating a level of relative importance of the corresponding granular topic categories to the demographic profile, and retrieving the demographic profiles having a highest weight for the assigned granular topic categories;
   - identifying additional content from an additional content database based on at least one of the hierarchy of demographic profiles and the at least one of the psychological states; and
   - presenting a portion of the additional content.

2. The method of claim 1 wherein identifying the hierarchy of the demographic profiles and the at least one of the psychological states comprises one of identifying of the hierarchy of the demographic profiles only;
   - identifying the at least one of the psychological states only; and identifying at least one of each.

3. The method of claim 1 further comprising: linking one or more of the generic topic categories to the psychological states;
   - linking the one or more granular topic categories from a contextual taxonomy to the demographic profiles;
   - linking the psychological states to the demographic profiles; and
   - linking at least the demographic profiles to additional content.

4. The method of claim 1 further comprising:
   - linking one or more of the granular topic categories from a contextual taxonomy to the psychological states.
   - linking the one or more granular topic categories to the demographic profiles; and
   - linking additional content to the demographic profiles and the psychological states.

* * * * *